United States Patent [19]

Waugh et al.

[11] Patent Number: 5,132,855

[45] Date of Patent: Jul. 21, 1992

[54] ADAPTIVE VELOCITY PROFILE SELECTION BASED ON TORQUE CONSTANT MEASUREMENT

[75] Inventors: David C. Waugh, Oklahoma City; Robert D. Murphy, Yukon, both of Okla.

[73] Assignee: Seagate Technology, Inc., Scotts Valley, Calif.

[21] Appl. No.: 442,194

[22] Filed: Nov. 28, 1989

[51] Int. Cl.⁵ .............................................. G11B 5/55
[52] U.S. Cl. .............................. 360/78.07; 360/78.06
[58] Field of Search ....................... 360/78.04–78.12, 360/135, 77.02–77.11; 318/561

[56] References Cited

U.S. PATENT DOCUMENTS

| | | | |
|---|---|---|---|
| 4,314,291 | 2/1982 | Oda et al. | 360/78.07 |
| 4,333,117 | 6/1982 | Johnson | 360/78.06 |
| 4,355,273 | 10/1982 | DuVall | 318/561 |
| 4,540,923 | 9/1985 | Kade et al. | 318/561 |
| 4,544,968 | 10/1985 | Anderson et al. | 360/78.07 |
| 4,591,933 | 5/1986 | Quackenbush | 360/78.07 |
| 4,697,127 | 9/1987 | Stich et al. | 318/561 |
| 4,775,903 | 10/1988 | Knowles | 360/78.07 |
| 4,796,112 | 1/1989 | Mizukami et al. | 360/78.07 |
| 4,835,633 | 5/1989 | Edel et al. | 360/78.12 |
| 4,899,234 | 2/1990 | Genheimer | 360/78.12 |
| 4,982,298 | 1/1991 | Volz et al. | 360/78.06 |

Primary Examiner—Aristotelis Psitos
Assistant Examiner—Steven R. Garland
Attorney, Agent, or Firm—Edward P. Heller, III; Bill D. McCarthy; Louis W. Watson

[57] ABSTRACT

A method for eliminating overshoot of a destination track by a servo head of a rotating disk data storage device during seeks wherein the seek is carried out in accordance with an adaptive velocity demand profile selected to undershoot the destination track by an amount sufficient to offset overshoot arising from an incapacity of the servo head to follow a velocity demand profile. Prior to performing the seek, the servo head is moved a distance about a null position on the disk at which the only force on the actuator on which the head is mounted arises from a constant current passed through the actuator and the time for the movement is measured and utilized to select the adaptive demand profile. Adaptive demand profiles are obtained by performing seeks while modifying a nominal profile to eliminate actuator current ringing at the end of the seek.

11 Claims, 4 Drawing Sheets

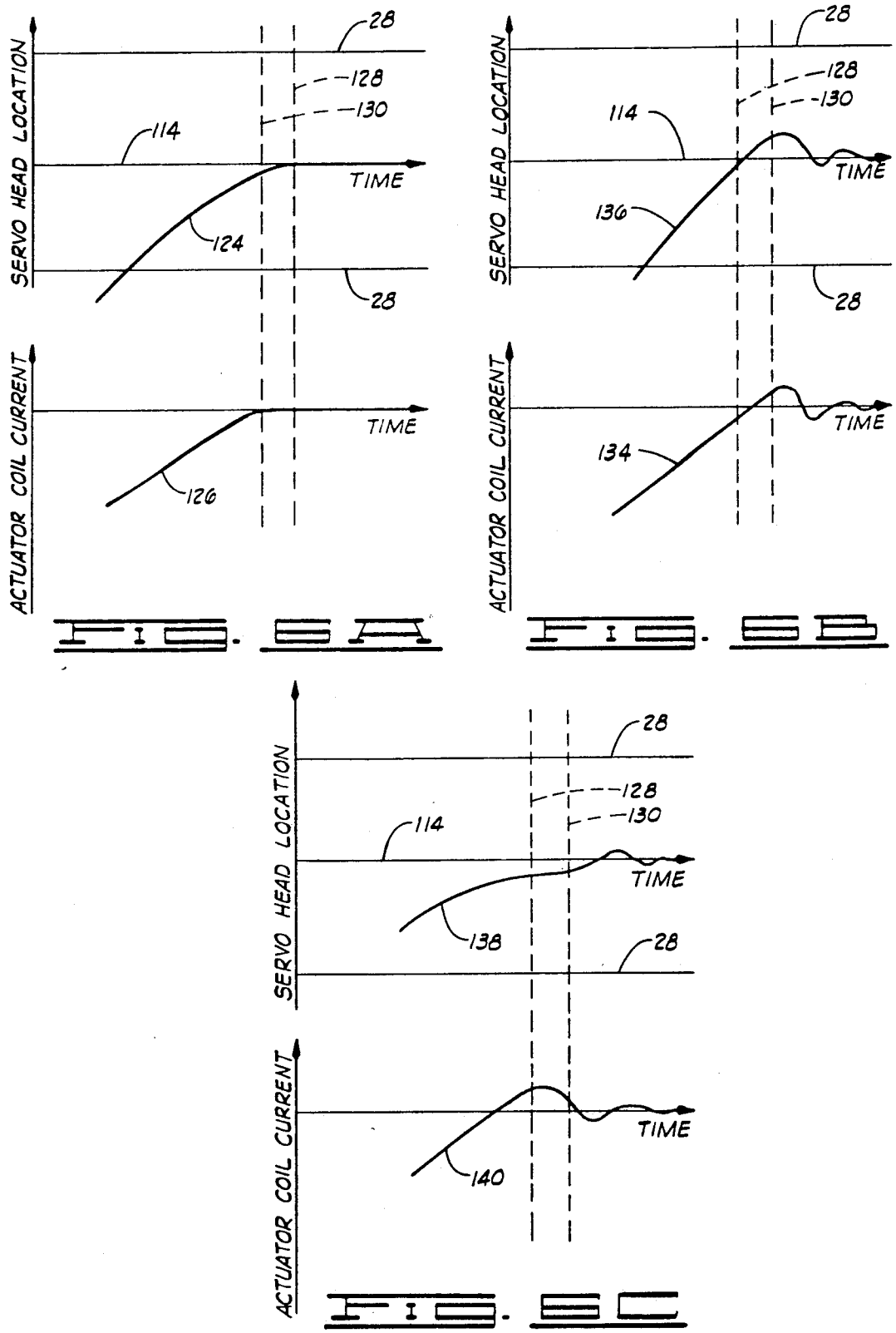

ADAPTIVE VELOCITY PROFILE SELECTION BASED ON TORQUE CONSTANT MEASUREMENT

BACKGROUND OF THE INVENTION

1. Field of the Invention

The present invention relates generally to improvements in servo systems, and, more particularly, but not by way of limitation to improvements in servo system for rotating disk data storage devices.

2. Brief Description of the Prior Art

In recent years, a great deal of effort has been directed toward increasing the capacity of rotating disk data storage devices; that is, devices that are comprised of a stack of rotating aluminum disks each having magnetic coatings on both sides for magnetic storage and subsequent reading of computer files. In such devices, a plurality of concentric data tracks is defined on each magnetizable surface and a read/write head that "flies" over each magnetizable surface is used, in a write mode in which a current is passed through a coil in the head, to write data to the track by magnetizing successive cells along the track in opposite directions. In a read mode of operation of the device, changes in the magnetic field adjacent junctions of oppositely magnetized cells will induce an emf in the coil of the head so that data written to a track can be read by maintaining the read/write head in proximity to the track while the disks rotate. Increasing the capacity of a rotating disk data storage system can be achieved by, among other things, increasing the density of tracks on the disks. Thus, for example, it is not uncommon for track spacings to be of the order of a thousandth of an inch.

The high density of tracks on the disks of these systems places high demands on servo systems that are used to maintain the alignment of the read/write heads with the tracks. For example, in a device in which the tracks are spaced by a thousandth of an inch, a misalignment of only a few ten thousandths can result in faulty reading of data stored on a disk or, worse, destroying information on one track while writing to an adjacent track on the disk. A servo system that will meet the demands that close spacing of tracks imposes on a servo system has been described in U.S. Pat. No. 4,811,135 issued Mar. 7, 1989 to Donald W. Janz, the teachings of which are hereby incorporated by reference.

In the Janz servo system, one side of one disk is a dedicated servo surface having concentric tracks defined by a servo pattern that can be read by a servo head mounted on an electrically responsive actuator that positions the servo head radially on the dedicated servo surface. Read/write heads are then mounted on the actuator in alignment with the servo head to be radially positioned above data tracks that are concentric to the tracks on the servo surface. For purposes of discussion of the present invention, it will be assumed that the invention is used in such a servo system. However, no limitation on the invention is intended by such assumption; the invention can be used equally well in a servo system in which bursts of servo information are embedded in tracks used for the storage of data. In such case, each read/write head becomes a servo head as such term is used with respect to the present invention.

The servo system of a rotating disk data storage device has two basic functions: track following, in which the servo and read/write heads are maintained in radial alignment with a selected cylinder of tracks defined on the stack of rotating disks, and track seeking in which the servo and read/write heads are moved from an initial track to a destination track to which data is to be written or from which data is to be read. It is with the relationship between these two functions that the invention is concerned.

In one type of servo system, which, for purposes of discussion but not of limitation, will be described below, the actuator is pivotally mounted adjacent the disk stack to support the servo and read write heads via arms that extend one end of the actuator into the stack. A coil mounted on the other end of the actuator is immersed in a magnetic field, having oppositely directed portions at the sides of the coil, so that a current passed through the actuator coil will give rise to a Lorentz force on the coil and, consequently, a torque on the actuator that will tend to pivot the actuator to move the servo and read/write heads across the disks with which they are associated. During track following, position error signals derived from the servo head and indicative of the alignment of the servo head with servo patterns on the servo surface are used to develop a control current that is passed through the actuator coil to maintain alignment of the servo head with tracks on the servo surface.

Servo systems further contain a microcomputer in which a velocity demand profile is stored for effecting seeks. In particular, during a seek, the microcomputer outputs a demand velocity, taken from the profile, that indicates the velocity the servo head should have at each of a number of selected radial positions of the servo head on the disk to be compared with the actual velocity of the head derived from the position error signals. A current is then passed through the actuator coil in relation to the comparison so that the actuator is accelerated in a direction and by an amount that is indicated by the profile. As the servo head nears the destination track, the velocities demanded by the profile are decreased so that, ideally, the servo head come to rest just as it reaches the destination track.

Unfortunately, the ideal case has not been achieved prior to the present invention nor can it be with velocity demand profiles that have heretofore been used to effect seeks. As will be clear from the above discussion, the current supplied to the actuator coil is proportional, during deceleration of the servo head toward the destination track, to the difference between the actual and demand velocities of the servo head. Thus, since the acceleration of the actuator is proportional to the Lorentz force arising from the current, the acceleration is proportional to the velocity of the servo head. As is well known, velocity dependent accelerations give rise to exponential approaches to a terminal velocity, the demand velocity in the present case, but such velocity will not be reached in a finite time. Thus, during a seek, the velocity of the servo head will always exceed the demand velocity provided by the velocity demand profile. Thus, when the servo head reaches the destination track, it will have a velocity that exceeds the ideal velocity that will cause it to come to rest at the destination track and overshoot will occur. In the past, such overshoot has been compensated after the transition to track following with the result that the servo head will undergo damped oscillations about the destination track for a time period following the transition. During this period, neither reading nor writing to the destination track can be reliably carried out so that the throughput of the data storage system is decreased by the need to permit the servo head to settle on the destination track and, consequently, the read/write heads to settle on the data tracks in the same cylinder as the destination track.

While the ability of the servo head to follow the velocity demand profile can be increased by increasing the torque constant of the actuator; that is, the ratio of the torque arising from the Lorentz force on the coil to the current through the actuator coil, such approach is itself subject to a limitation. If the torque constant is made too large, the acceleration of the servo head will no longer depend on the actual velocity because of the time required to generate signals indicative of the actual velocity of the servo head. In this case, the exponential decay of the servo head velocity is replaced by a sequence of large velocity changes that overshoot the demand velocities provided by the velocity demand profile and oscillation of the actuator during the seek ensues. As a result, control of the seek is lost. Thus, the torque constant must be limited to a value that will enable control of the seek to be maintained so that the problem of excessive settle time following a seek has not heretofore been solved.

SUMMARY OF THE INVENTION

In one aspect, the present invention provides a method for eliminating overshoot of a destination track during seeks by exploiting the relationship of the overshoot to the torque constant of the actuator; that is, to the mechanical response of the actuator to a current supplied thereto. As will be clear from the above discussion, the greater the torque constant, the more closely will the actual velocity of the servo head follow the velocity demand profile s that the value of the torque constant provides a measure of the capacity of the actuator to follow the velocity demand profile and, consequently, a quantitative measure of the tendency of the servo head to overshoot the destination track. Moreover, the torque constant is a measurable quantity so that the result of the measurement can be used to adapt the velocity demand profile in a way that will eliminate the overshoot. In this aspect, the invention provides a method for eliminating overshoot by measuring a parameter that is indicative of the torque constant of the actuator and then effecting seeks in accordance with an adaptive velocity demand profile, selected in relation to a parameter, that will tend to cause an undershoot of the destination track by an amount just sufficient to offset the overshoot arising from the inability of the servo head to follow the velocity demand profile.

In a second aspect of the invention, a method is presented for developing a series of such adaptive velocity demand profiles so that such profiles can be stored in the microcomputer of a servo system which is programmed to measure the parameter and select an appropriate adaptive velocity demand profile accordingly. In this aspect of the invention, use is made of the effect of overshoot on the current through the actuator coil following movement of the servo head to the destination track; that is, during and after a transition to track following has been effected. If overshoot has occurred, the servo head will come to rest at a location beyond the destination track so that a reverse current will be required to draw the servo head back to the track. Thus, in general, overshoot will be marked by damped oscillation, or ringing, of the current through the actuator coil at the end of a seek to a destination track. As will be discussed below, ringing similarly occurs in the case of undershoot of the servo head. Thus, by observing the current through the actuator coil, it is possible to determine that the servo head has not approached the destination track with an ideal velocity that will bring it to rest just as it reaches the destination track.

In this second aspect of the invention, the actuator current for a sample of data storage devices, having a range of torque constants, is observed while terminal portions of the velocity demand profile are adjusted until ringing of the actuator coil current is eliminated. Concurrently, a parameter indicative of the torque constant is measured so that a selection of adaptive velocity demand profiles that will provide an ideal approach to a destination track are obtained in relation to the torque constant parameter. This selection of adaptive velocity profiles is then stored with the corresponding values of the parameter in the microcomputer of the servo system and such microcomputer is programmed to measure the parameter at selected times during the operation of the data storage device and select the adaptive velocity demand corresponding to the measured parameter to effect seeks to destination tracks.

An object of the invention is to eliminate overshoot of data tracks during seeks effected in the operation of a rotating disk data storage device.

A second object of the invention is to increase the throughput of a rotating disk data storage device by limiting actuator settle times following a seek to a specific track whereon data is stored.

Yet a further object of the invention is to program a microcomputer in a rotating disk data storage system to effect movement between data tracks in the minimum possible time.

Other objects, features and advantages of the present invention will become apparent from the following detailed description when read in conjunction with the drawings and appended claims.

BRIEF DESCRIPTION OF THE DRAWINGS

FIGS. 6A-6C illustrate servo head location and current variations with time adjacent a destination track for an ideal movement of the servo head between tracks on a disk, a movement with overshoot, and a movement with undershoot.

DESCRIPTION OF THE SERVO SYSTEM

Figure 1:
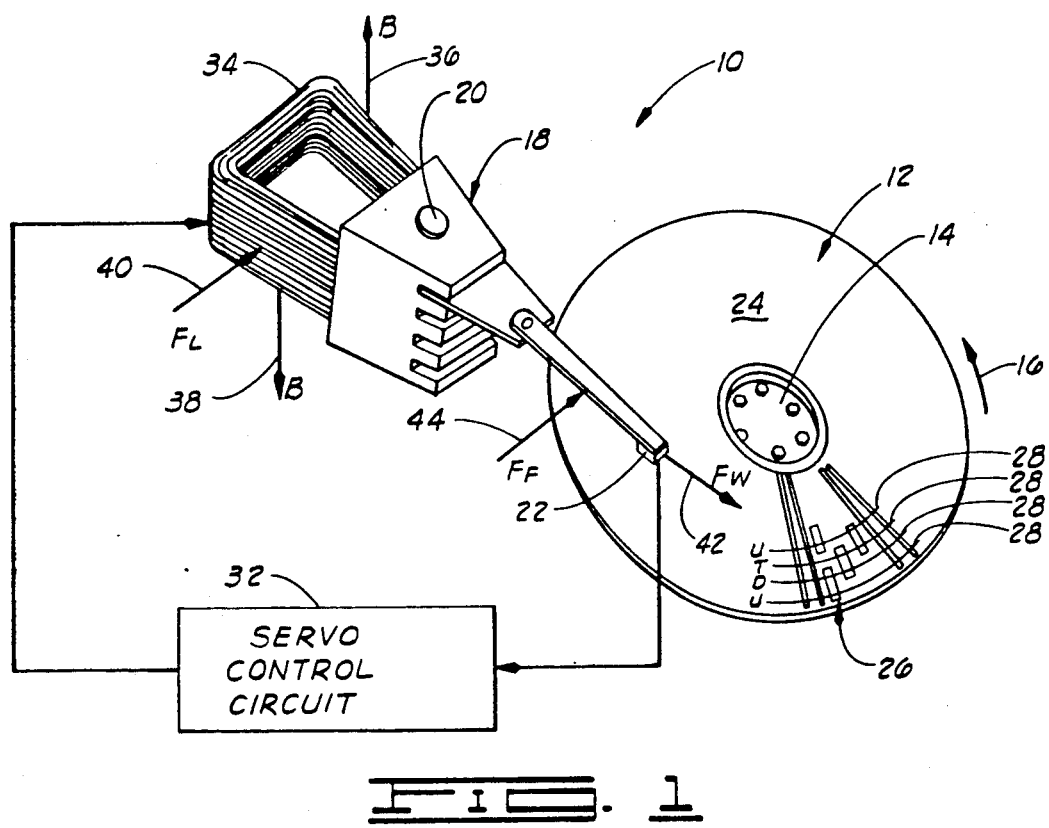
FIG. 1 is a schematic illustration of the servo system of a rotating disk data storage device.

FIG. 1, which schematically illustrates a rotating disk data storage device servo system, designated by the numeral 10, has been included to provide a basis for discussing the methods of the present invention. The servo system 10 is generally comprised of a plurality of disks, only one of which has been illustrated and designated by the numeral 12 in FIG. 1, that are mounted in a stack on a spindle 14 for rotation in the direction 16. Adjacent the disk stack, the servo system 10 is further comprised of an electromechanical actuator 18 that is pivotally mounted on a spindle 20 to support a plurality of conventional read/write heads (not shown) in close proximity to the surfaces of the disks of the stack as shown for head 22 and disk 12. For purposes of discussion, but not of limitation, it will be assumed that the servo system 10 is of the type described in the aforementioned U.S. Pat. No. 4,811,135 to Janz so that one surface of one disk, surface 24 of disk 12 in FIG. 1, is dedicated to operation of the servo system. Accordingly, the surface 24 will be referred to hereinafter as a dedicated servo surface and the head 22 will be referred to as the servo head 22.

A servo pattern, generally indicated at 26 in FIG. 1 is magnetically recorded on the surface 24 to define a plurality of concentric tracks 28 (See also FIG. 4) that extend from a selected outer radius to a selected inner radius on the surface 24 and the servo head 22 contains a coil 30 (FIG. 3) in which an emf is induced as edges of the servo pattern pass under the head 22. The emfs induced in the coil 30 are transmitted to a servo control circuit 32 which generates control currents that are used to maintain the head 22 above a selected track and, as discussed below, move the head from an initial track above which the head 22 is located to a selected destination track. (As is conventional, the tracks 28 are aligned with data tracks on other disks of the data storage device and the head 22 is aligned with other read/write heads of the device so that control of the head 22 with respect to the tracks 28 effects control of the read/write heads with respect to data tracks.) In particular, the control currents are passed through an actuator coil 34, at the end of the actuator 18 opposite the end whereon the head 22 is mounted, that is immersed in magnetic fields, indicated at 36 and 38, having opposite directions at opposite sides of the coil 34. (The fields 36 and 38 are conventionally produced by permanent magnets, not shown, positioned about the coil 34.) Thus, a Lorentz force, indicated at 40 in FIG. 1, on the coil 34 can be caused to be exerted on the actuator 18 in either direction by the servo control circuit 32 for both track following and track seeking purposes.

The present invention contemplates that additional forces may be exerted on the actuator 18 and provision is made for taking such forces, if present, into account in a manner to be discussed below. To provide a basis for such discussion, it will be useful to briefly discuss these additional forces before continuing with the description of the servo system 10.

Figure 2:
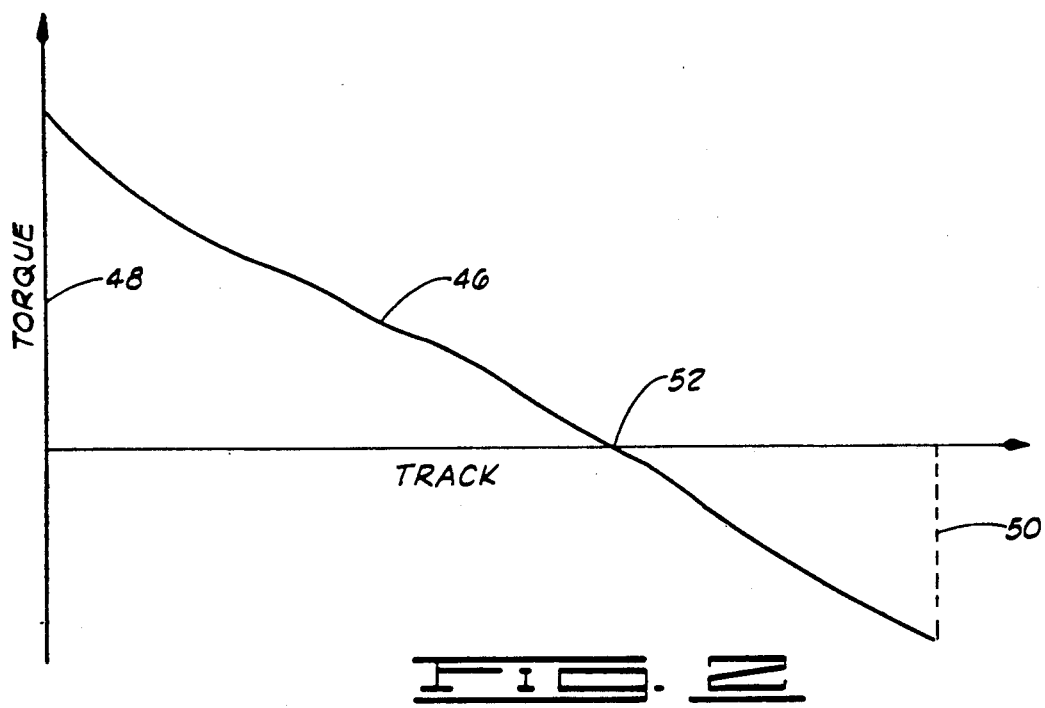
FIG. 2 is a diagram of the variation of windage and flex forces with location of the servo head on the disk of the servo system.

As shown in FIG. 1, a windage force 42, caused by air drawn along the disk 12, is exerted on the head 22 and a flex force 44 is exerted on the side of the actuator 18 by electrical connections to the actuator coil 34, to the servo head 22, and to the read/write heads associated with disks upon which data is stored. In general, these forces vary with the position of the heads on the disks but vary little from one device of a particular type to another. These forces will exert a location dependent torque on the actuator 18 whose form has been shown by the curve 46 in FIG. 2 for the assumed type of data storage device under consideration. As shown therein, at the outermost track on the surface 24, indicated by the axis 48, such torque has a direction tending to drive the actuator 18 toward the center of the spindle 14, indicated by a positive value for the torque, and has a large value. As the head 22 is moved toward the innermost track, indicated by the dashed line 50 in FIG. 2, the torque exerted on the actuator by windage and flex forces decreases to zero at a null position 52 and then increases to a maximum value in the opposite direction at the innermost track. A will be discussed below, such form of the torque exerted by forces other than the Lorentz force can be exploited to simplify practice of the methods of the present invention.

Figure 3:
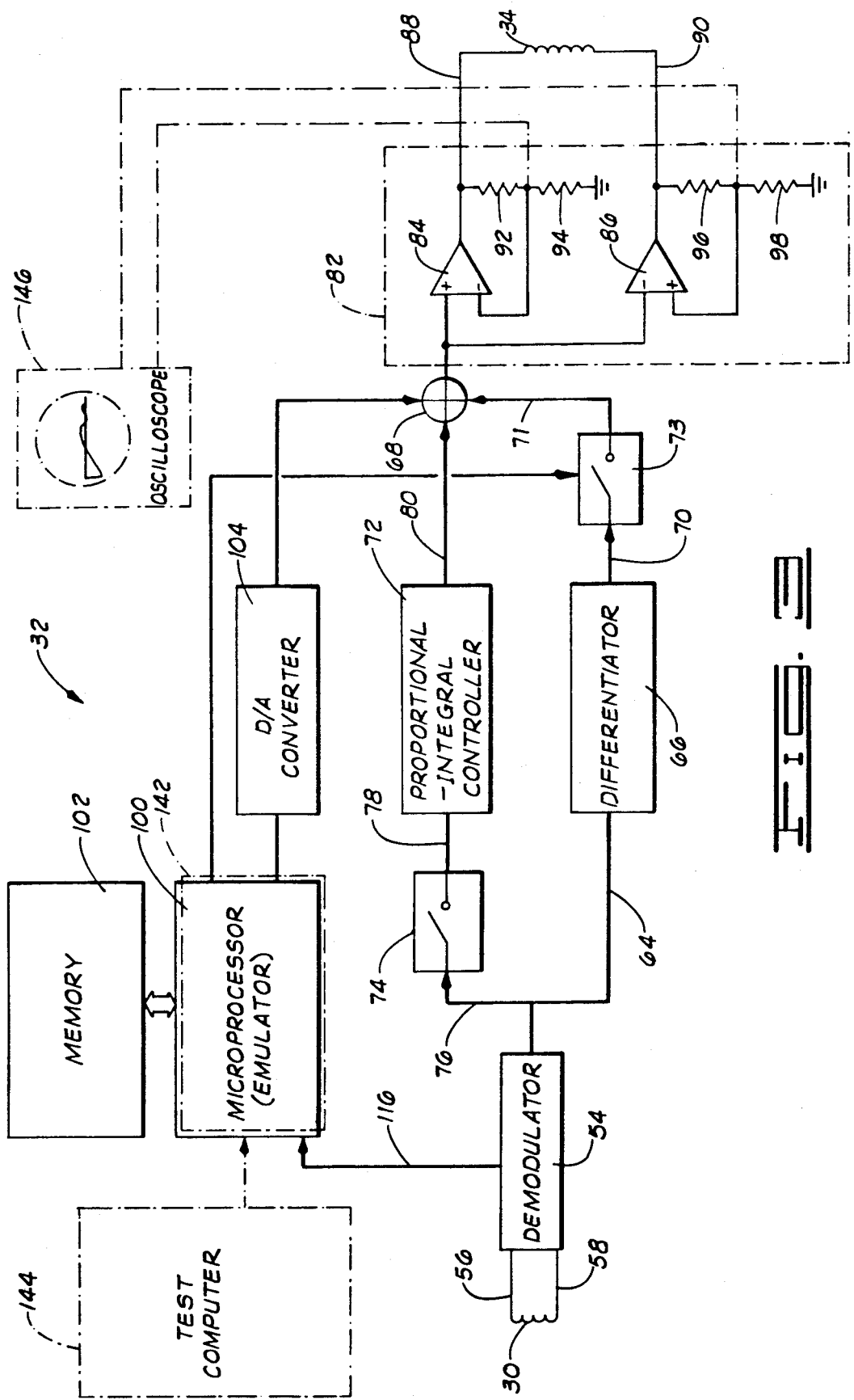
FIG. 3 is a diagram of the control circuit for the servo system of FIG. 1.
Figure 4:
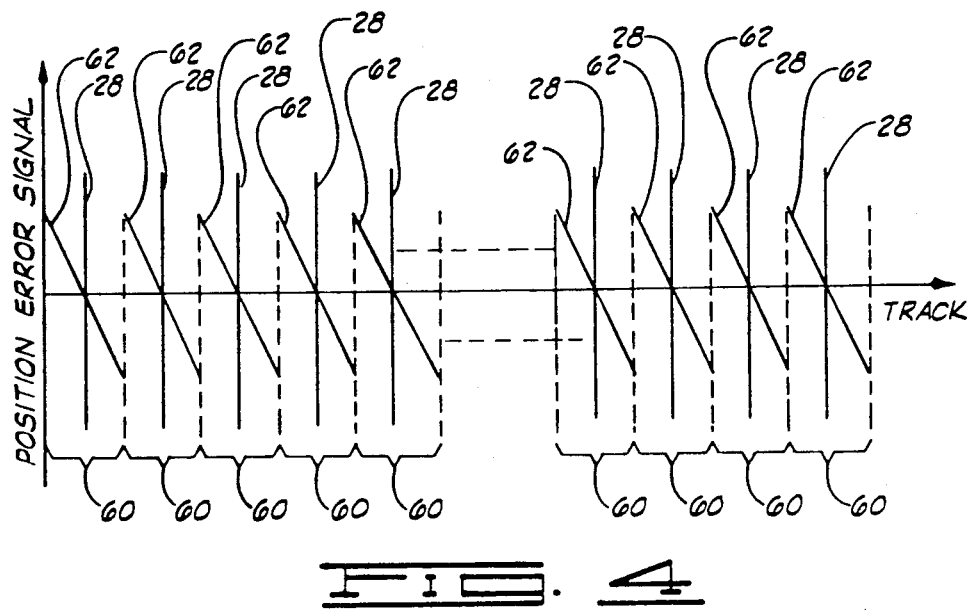
FIG. 4 is a diagram of control regions defined on tracks on the disk.

Returning to the servo system 10, the servo control circuit 32 thereof has been illustrated in FIG. 3 to which attention is now invited. As shown therein, the circuit 32 includes a demodulator 54 of conventional construction that receives emf's induced in the servo head coil 30 via conductors 56 and 58 and generates a position error signals indicative of the displacement of the servo head 22 from tracks 28 on the surface 24 in a manner discussed in the aforementioned U.S. Pat. No. 4,811,135. In particular, and as shown in FIG. 4, the surface 24 is divided into a plurality of control regions 60, each centered on a track 28, and, in each region, the position error signal varies substantially linearly with displacement of the servo head 22 from the track centered therein as shown by the curves 62 in FIG. 4.

The position error signal is transmitted on conducting path 64 to a differentiator 66 that differentiates the position error signal to provide a signal indicative of the velocity of the servo head 22 to a summing junction 68 via conducting paths 70 and 71 and an electronic switch 73. Additionally, the position error signal is transmitted to a proportional-integral controller 72, via an electronic switch 74 and conducting paths 76 and 78. At such times that the switch 74 is closed, the proportional-integral controller 72 provides a signal proportional in part to the position error signal and in part to the integral thereof to the summing junction 68 on conducting path 80. The output of the summing junction 68 is transmitted to a conventional transconductance power amplifier 82 that is comprised of two operational amplifiers, 84 and 86, whose outputs are connected to opposite ends of the actuator coil 34 via conductors 88 and 90 respectively. The amplifiers 84 and 86 are provided with feedback loops, each comprised of a pair of series resistors, 92 and 94 for the amplifier 84 and 96 and 98 for the amplifier 86, connected to the amplifiers 84 and 86 in the usual transconductance configuration. The construction of the amplifier 82 is utilized in implementing the present invention in a manner to be discussed below.

In addition to the demodulator 54, the differentiator 66, the proportional-integral controller 72 and the power amplifier 82, the servo control circuit 32 is further comprised of a microcomputer (not numerically designated in the drawings) that is, in turn, comprised of a microprocessor 100 and a memory 102. The microcomputer is programmed to control the remainder of the circuit 32 in a manner that will now be discussed.

The switches 73 and 74 are closed by a suitable signals from the microprocessor 100 during track following so that the summing junction receives signals indicative of the position error signal, its integral, and the speed of the servo head 22 during this mode of operation. Additionally, the summing junction can have impressed thereon a signal specified by the microprocessor 100 and transmitted to the summing junction via a D/A 104 converter to eliminate the effects of the windage and flex forces on the actuator 18 as well as offsets in the electronic components of the circuit 32 as discussed in U.S. patent application, Ser. No. 366,753 filed Jun. 14, 1989, now abandoned, by Murphy and Genheimer and entitled "Method and Apparatus for Minimizing Settle Time in Servo Systems for Following Magnetically Recorded Tracks in Rotating Disk Data Storage Device". Thus, the basic control scheme of the servo system 10 during track following is a modified proportional control scheme in which a current proportional in part to the position error signal is passed through the actuator coil 34. This current is modified, by the presence of the differentiator 66, to take the velocity of the servo head 22 into account in effecting proportional control and further modified to eliminate long term systematic effects; for example, electronic offsets and windage and flex forces, that tend to drive the servo head off track by the integrating characteristics of the controller 72 and by the signal supplied to the summing junction 64 via the D/A converter 104. As discussed in the aforementioned U.S. patent application, Ser. No. 366,753, abandoned, the latter signal is introduced to the summing junction 68 at the time a transition to track following from track seeking occurs to eliminate systematic effects that might otherwise cause a long time between the transition and settling of the servo head on the destination track. The presence of such signal can be exploited in implementing the present invention in a manner to be discussed below.

Figure 5:
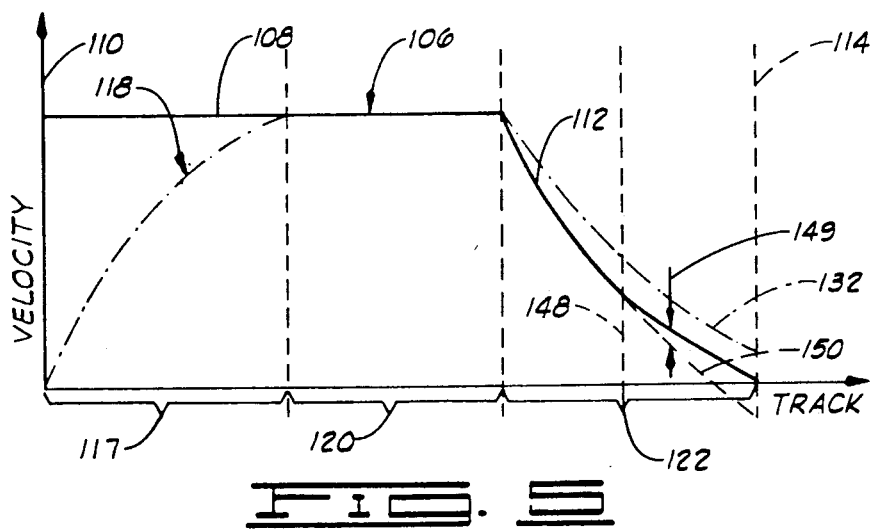
FIG. 5 is a diagram of a velocity demand profile used in effecting movement of a servo head from an initial track to a destination track illustrating the manner in which the profile is adapted in accordance with the present invention.

In a seek mode of operation of the servo system 10, the switch 74 is held open by the microprocessor 100 so that the summing junction 64 receives signals from the differentiator 66, indicative of the actual velocity of the servo head 22, and demanded velocity signals taken from a demand velocity profile stored in the memory 102 of the microcomputer and impressed on the summing junction 68 via the D/A converter 104. The solid curve in FIG. 5 illustrates a typical long seek profile as taught by the prior art. (Short seeks are effected by picking up at an appropriate place on the long seek profile.) As shown in FIG. 5, the prior art profile, sometimes referred to herein as a nominal velocity demand profile has a constant, large velocity portion 108 adjacent the initial track from which the seek commences, indicated by the vertical axis 110 in FIG. 5, and a portion 112 that drops smoothly to zero at the destination track indicated at 114 in FIG. 5. (The nominal velocity demand profile can be obtained in any convenient way and the present invention is not limited to any particular manner in which such profile is obtained.)

In order to implement the seek in accordance with a velocity demand profile, whether the nominal velocity demand profile or the adaptive velocity demand profile to be described below, the demodulator 54 is constructed to provide a signal indicative of the passage of the servo head 22 across a boundary between two control regions 60 and such signal is supplied to the microprocessor 100 on a conducting path 116 by, for example, polling of the demodulator 54. With one exception to be noted below, the microcomputer is programmed to provide, in response to this signal, the value of the demand velocity taken from the profile for the next boundary crossing to the D/A converter 104 and, thence, to the summing junction 68. Thus, the summing junction will provide a signal to the amplifier 82 that will pass a current through the actuator coil 34 in a direction and of a magnitude that will tend to cause the actual velocity of the servo head 22 to follow the demand velocity profile. The exception occurs as the servo head enters the control region about the destination track. The velocity supplied at this time will be the velocity the servo head should have at the time the transition to track following occurs to coast from the point at which the transition occurs to the destination track. (The microcomputer is programmed to count boundary crossing signals from the demodulator 54 so that the time at which the transition is to occur can be similarly programmed into the microcomputer.)

The implementation of the seek in this manner will cause an initial acceleration of the servo head 22 during a time period indicated at 117 in FIG. 5, as indicated by the portion 118 of an actual velocity curve for the servo head 22, to a maximum velocity chosen to provide a minimum seek time consistent with control of the seek. The acceleration will be followed by a constant velocity period, indicated at 120 in FIG. 5 and a deceleration period, indicated at 122, in which, ideally, the servo head 22 will follow the profile 106 to a zero velocity at the destination track 114.

This ideal situation has been further illustrated in FIG. 6A in which the upper graph therein illustrates, as a curve 124, the variation of location of the servo head 22 with time as the servo head approaches the destination track 114 (the horizontal axis in the upper graph) and the lower graph illustrates, as a curve 126, the variation of current through the actuator coil 34 with time. The vertical dashed line 128, that is continued from the upper graph to the lower, indicates the time the servo head reaches the destination track 114 in this ideal case and the dashed line 130 indicates the time the transition to track following occurs. As shown by these curves, the current through the actuator coil will become zero as the transition to track following occurs, with the signal provided by the proportional-integral controller 72 just offsetting the velocity signal provided by the differentiator 66, and the servo head will coast to the destination track which it reaches with zero velocity as shown in the upper curve. (The curves in FIG. 6A, as well as similar curves shown in FIGS. 6B and 6C ignore the effects of the windage and flex forces and of electronics offsets so that only the effect of the profile following by the head 22 is illustrated therein. The presence of forces other than the Lorentz force 40 on the actuator 18 and the presence of offsets in the electronics will be discussed below.)

In practice, this ideal situation does not occur. Rather, for reasons noted above, the servo head 22 cannot follow the velocity profile so that the actual velocity during deceleration will have the general form illustrated in the portion 132 of the actual velocity curve shown in FIG. 5. That is, the velocity with which the servo head approaches the destination track 114 will exceed the velocity demanded by the velocity demand profile. The result will be overshoot of the destination track as illustrated in FIG. 6B in which the times at which the servo head would ideally reach the destination track and at which the transition to track following for the ideal case, have again been indicated by vertical dashed lines 128 and 130 respectively.

As shown in FIG. 6B, the excessive velocity of the servo head 22 as the head 22 approaches the destination track 114 will result in a nonzero current through the actuator coil 34 as the transition to track following occurs as shown by the current versus time curve 134 and will further cause the servo head to prematurely reach the destination track with a nonzero velocity as shown by the location versus time curve 136. Further, as shown by the latter curve, the servo head 22 will continue beyond the destination track so that stable movement of the head 22 along the destination track can only be achieved by operation of the proportional-integral controller 72 and the differentiator 66 after the transition to the track following mode of operation has occurred. The net result is that the head 22 will undergo damped oscillations about the destination track 114 (curve 136) for a time following the movement to such track while settling onto the track occurs and the current through the actuator coil 34 will undergo ringing until the settling has been completed.

FIG. 6C has been included to illustrate a third case, undershoot, in the approach of the servo head 22 to the destination track 114 to provide a basis for discussion of the implementation of the invention to be described below. As in the case of FIGS. 6A and 6B, FIG. 6C illustrates the location of the servo head, curve 138, and the actuator current, curve 140, with time and the times at which the servo head would reach the destination track and at which the transition to track following would occur for the ideal case have been shown as dashed lines 128 and 130 respectively as in FIGS. 6A and 6B. Undershoot occurs when the servo head 22 approaches the destination track 114 with too low a velocity to coast to the track after the transition to the track following mode of operation of the servo system 10. In this case, the servo head will come to rest before the destination track is reached so that the head must be moved to the track by operation of the controller 72 and differentiator 66 after the transition has occurred as indicated by the curve 138 in FIG. 6C. Moreover, since the velocity demanded by the profile will exceed the actual velocity of the servo head 22 as it approaches the destination track in this case, the current through the actuator coil 34 will prematurely reach zero and then increase in the opposite direction as shown in the lower curve of FIG. 6C. Thereafter, the servo head will undergo damped oscillations for a time about the destination track while the current through the actuator coil will vary, or ring, about a zero value. Thus, it will be seen by comparing the current versus time curves of FIG. 6 the current through the actuator coil 34 will ring at the end of a seek to the destination track for both the overshoot and undershoot cases while it will drop smoothly to zero for an ideal seek. The significance of this point will become clear below.

SERVO SYSTEM ADAPTATION

Referring once again to FIGS. 3 and 5, the method for adapting the servo systems 10 of data storage devices to eliminate overshoot caused by an inability of the actuator 18 of the servo system 10 to follow a velocity demand profile will now be described. Initially, it is noted that while servo systems of a given type will be constructed to selected specifications, tolerances that must exist in this construction will be sufficient in a high density data storage device to cause the servo head of different devices to exhibit different amounts of overshoot. Accordingly, the methods of the present invention contemplate that each servo system of a particular model of data storage device will be provided with the capacity to eliminate overshoot for any value of the torque constant of the actuator of the servo system. To this end, the adaptation is developed using a sample of data storage devices for which the actuators will exhibit a range of current to torque characteristics within specifications for the model.

In order to adapt the servo system 10 to variations in actuator torque constant, the servo control circuit 32 for each member of the sample is modified as indicated in dot-dash line in FIG. 3. Specifically, the microprocessor 100 is replaced by an emulator 142 that will carry out all functions of the microprocessor 100 but is controlled by a test computer 144 that is programmed to permit the velocity demand profile to be varied from the profile 106 that has been illustrated in FIG. 5. Additionally, an oscilloscope is connected between the junction of resistors 92 and 94 and the junction of resistors 96 and 98 of the feedback loops of amplifiers 84 and 86 to permit observation of the current through the coil 34 of the actuator 18. Thus, the curves 126, 134, and 140 shown in FIG. 6 are made observable.

As noted above, the curves 126, 134 and 140 are illustrated for the case in which offsets in the electronic components of the servo system 10 have been neglected and, further, for the case in which the windage and flex forces will have no effect on the settle characteristics of the servo head 22 on the destination track. Since both the offsets and the flex and windage forces can give rise to ringing in the actuator coil current at the end of a seek to a destination track as discussed in the aforementioned U.S. patent application, Ser. No. 366,753, abandoned, it is contemplated that the effect of both the offsets and the forces will be removed prior to adapting the velocity demand profile as will now be described.

Preferably, the effect of offsets in the electronics in which the servo system 10 is embodied is carried out using the methods described in the aforementioned U.S. patent application Ser. No. 366,753; that is, by introducing a signal from the emulator 142, which has replaced the microprocessor 100, to the summing junction 68 via the D/A converter 104 at the time a transition from the track seeking mode of operation to the track following mode of operation occurs. In this case, a suitable way of eliminating the effect of windage and flex forces during adaptation of the velocity demand profile is to select a track substantially at the null position 52 as the destination track for effecting the adaptation. As noted above, windage and flex forces cancel at such null position. Alternatively, adjustment signals can be supplied to offset terminals (not shown) of the operational amplifiers 84 and 86 that will cause the servo head 22 to follow a selected destination track with zero input signals to the amplifiers 84 and 86. In this case, electronic offsets are removed from the servo system while the windage and flex forces give rise to a constant current at the destination track that will merely shift the current versus time curves shown in FIG. 6 vertically without changing the form of such curves.

Figure 7:
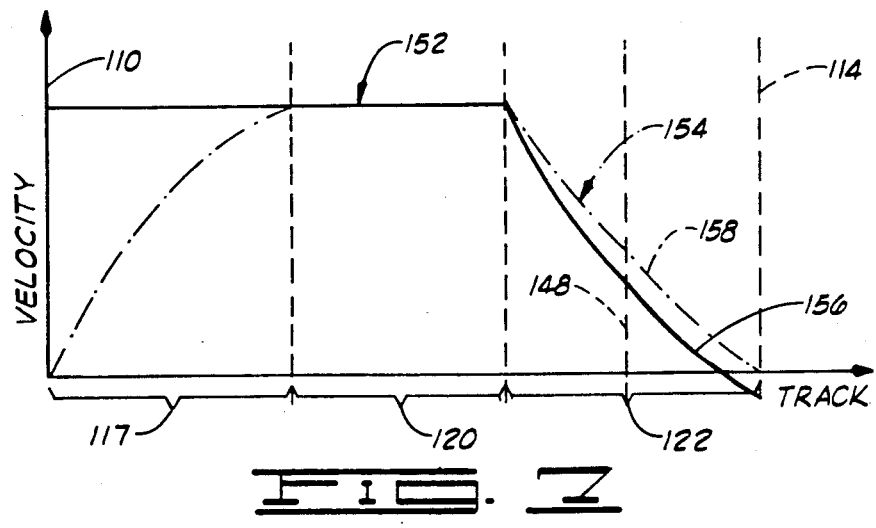
FIG. 7 illustrates the adaptive velocity demand profile of the present invention and the movement of a servo head in accordance with such profile.

With these initial steps completed, the velocity demand profile is adapted for each member of the sample of data storage devices by selecting a track, indicated at 148 in FIGS. 5 and 7, that the servo head 22 will cross in a seek from a selected initial track to the selected destination track during the deceleration stage of the seek. A suitable track for this selection is a track in the range of thirty to forty tracks preceding the destination track. Following the selection of this preceding track, velocity increments, as indicated for one track at 149 in FIG. 5, are subtracted from the values of the velocities demanded by the profile for the tracks between the track 148 and the destination track as shown at 150 in FIG. 5. A particularly suitable selection for these increments is a selection that increases linearly from the track 148 to the destination track 114 so that the portion 150 of the resulting profile will have the same general form as corresponding portions of the nominal velocity demand profile 106 but will be reduced therefrom by successively increasing amounts.

After subtraction of the increments from the nominal profile 106, a seek is performed to the destination track while observing the actuator coil current on the oscilloscope 146. Should the selection of the increments not cause the ideal current versus time curve 126, a new selection of increments to the selected number of tracks preceding the destination track is made and the seek is repeated while again observing the actuator coil current on the oscilloscope 146. The subtraction of increments from the nominal velocity demand profile and subsequent carrying out of seeks to the selected destination track is continued until the ideal current versus time curve 126 is observed. It will be noticed that, so long as overshoot occurs, the magnitude of the ringing will decrease as the sizes of the increments are increased. Should the set of increments for which the ideal current versus time curve 126 occurs be passed, so that undershoot occurs, further increase in the sizes of the increments will result in increasing amounts of overshoot that will be detected as increases in the magnitude of the ringing of the actuator coil current at the end of a seek. Thus, both excessive and insufficient sizes of the increments can be readily detected to enable selection of the set of increments that will yield the ideal current versus time curve 126.

Concurrently with the repetition of seeks using different profiles as described above, a measurement is made of a parameter that is indicative of the mechanical response of the actuator to a current; that is, to the current to torque characteristics of the actuator 18. Specifically, the servo head 22 is moved to the null position 52 at which windage and flex forces cancel and short seeks are made about such position at a constant current that is of the order of magnitude of the actuator current following entry of the servo head into the control region 60 containing the destination track. During such seeks, the switches 73 and 74 are held open so that the current through the actuator coil 34 arises only in response to a signal supplied to the summing junction 68 via the D/A converter 104. Suitably, these short seeks can be carried out over a range of six to ten tracks. Since the actuator coil current is constant during these short movements of the servo head, the Lorentz force on the actuator will similarly be constant. Further, because of the location of the servo head 22 during these movements, windage and flex forces cancel. Thus, the servo head will accelerate at a constant rate that is proportional to the current to torque characteristics of the actuator 18 so that the time for the movement across the selected number of tracks is a measure of the torque constant of the actuator. Such time, measurable by appropriate programming of the test computer 114, is selected as the parameter indicative of the mechanical response of the actuator to a current referred to above.

It will thus be seen that each member of the sample of data storage devices yields both an adaptive velocity profile suitable for that member and a parameter that is indicative of the factor, actuator torque constant, that is related to the overshoot that occurs with a nominal velocity demand profile selected on the assumption that the servo head 22 will follow such profile. Selected ones of these adaptive velocity demand profiles and the corresponding times indicative of the mechanical response of the actuator 18 are subsequently stored in the memories of the microcomputers of the servo control circuit 32 and the microcomputers of the circuits 32 are programmed to measure such time upon device start up and thereafter select the adaptive velocity demand profile corresponding to the measured time in effecting seeks between track. A suitable selection of stored adaptive velocity demand profiles can be obtained by dividing the set of times obtained with the sample data storage devices into a plurality of ranges and selecting one adaptive velocity demand profile and the corresponding torque constant indicative time in the memory 102 of the microcomputer of the servo control circuit 32.

OPERATION OF THE ADAPTED SERVO SYSTEM

FIG. 7 has been included to provide a basis for a discussion of the operation of a servo system including a table of adaptive velocity demand profiles developed as described above. In particular, FIG. 7 illustrates an adaptive velocity demand profile 152 which is identical to the nominal velocity demand profile 106 except for terminal portions of the two profiles occurring during the deceleration stage for the servo head 22 during a movement from an initial track 110 to a destination track 114. Such Figure further illustrates, at 154 the actual velocity the servo head will have at various tracks during such movement.

As can be seen by comparing FIGS. 5 and 7, the portion 156 of the adaptive velocity demand profile 152 following the selected track 148 preceding the destination track 114 calls for servo head velocities that are lower than the corresponding velocities demanded by the nominal velocity demand profile. That is, the adaptive velocity demand profile calls for an undershoot of the destination track as is evident from the crossing of the curve 152 before the servo head has reached the destination track.

However, since the actuator 18 cannot follow the velocity demand profile, whether nominal or adaptive, the actual velocity of the servo head 22 will exceed the velocity demanded by the adaptive velocity demand profile as shown by the portion 158 of the actual velocity curve 154. Such curve, if selected in accordance with the time for a short sweep about the null position 52 as described above, will decrease steadily toward a zero velocity that is attained just as the servo head 22 reaches the destination track to just offset the overshoot occasioned by the inability of the actuator to follow the velocity demand profile.

Accordingly, at such time that the servo system 10 is placed into operation, the programming of the microcomputer in the servo control circuit will cause the servo head to be moved to the null position 52 on the disk 12 and perform a short seek at constant current thereabout. During such seek, the time required to traverse a selected number of tracks is measured. Thereafter, all movements of the servo head 22 from an initial track to a selected destination track are made in accordance with the stored adaptive velocity demand profile, corresponding to the measured time, that will provide an amount of undershoot in such movement that will be sufficient to offset the overshoot caused by the inability of the actuator 18 to follow a velocity demand profile.

It will be clear that the present invention is well adapted to carry out the objects and attain the ends and advantages mentioned as well as those inherent therein. While presently preferred methods have been describe for purposes of this disclosure, numerous changes may be made which will readily suggest themselves to those skilled in the art and which are encompassed in the spirit of the invention disclosed and as defined in the appended claims.

What is claimed is:

1. In a servo system for a rotating disk data storage device of the type wherein a servo head adjacent one side of a rotating disk is moved radially between tracks magnetically recorded on the disk in a seek mode of operation of the servo system by an electromechanical actuator responsive to a current supplied thereto to accelerate the servo head in relation to a head velocity demand profile, a method for eliminating overshoot of a destination track arising from an inability of the servo head to follow the velocity demand profile, comprising the steps of:

measuring a parameter indicative of the mechanical response of the actuator to an electrical current supplied thereto; and thereafter effecting movement of the head in the seek mode in accordance with an adaptive velocity demand profile having terminal portions selected in relation to the value of said parameter to eliminate actuator current ringing following movement of the servo head to the destination track;

wherein the adaptive velocity demand profile is further characterized as having terminal portions differing from a nominal velocity demand profile selected to move a servo head following such nominal velocity demand profile to the destination track without overshoot by selected velocity increments subtracted from velocities demanded by the nominal velocity demand profile for a selected number of consecutive tracks terminating with the destination track.

2. The method of claim 1 wherein the servo system is further characterized as being of the type wherein the actuator is subjected to a plurality of head location dependent forces that cancel at a null position for the head on the disk and wherein said parameter is the time required for the head to traverse a selected number of tracks about the null position in response to a selected current supplied to the actuator.

3. The method of claim 1 wherein the velocity increments increase linearly to a maximum value at the destination track.

4. A method for adapting servo systems of rotating disk data storage devices, each servo system comprised of a microcomputer, a servo head adjacent a rotating disk whereon are magnetically recorded a plurality of concentric servo tracks, and an actuator, responsive to an actuator current supplied to the actuator, that moves the servo head between selected tracks on the disk in accordance with a velocity demand profile stored in the microcomputer, to differences in actuator current to torque characteristics of the actuators of different data storage devices, the method comprising the steps of:

selecting a sample of data storage devices;

successively moving the servo head of each member of the sample from a selected initial track to a selected destination track in accordance with a plurality of velocity demand profiles while observing the actuator current to identify an adaptive velocity demand profile that will eliminate actuator current ringing following movement of the servo head to the destination track;

measuring, for each member of the sample, a parameter indicative of the mechanical response of said actuator to an electrical current supplied thereto, whereby each adaptive velocity demand profile is corresponded to a measured value of said parameter;

storing a selection of adaptive velocity demand profiles and the values of said parameter corresponding to the selected profiles in the servo system microcomputers of the data storage devices; and programming the microcomputers of the servo systems of the data storage devices to measure said parameter at selected times during the operation of the data storage devices and to select the corresponding velocity demand profile for thereafter moving the servo head between selected tracks.

5. The method of claim 4 wherein the servo system is characterized as being of the type wherein the actuator is subjected to a plurality of servo head location dependent forces that cancel at a null position for the head on the disk; and wherein said parameter is the time required for the head to traverse a selected number of tracks about the null position in response to a selected current supplied to the actuator.

6. The method of claim 5 wherein the destination track to which the servo head is successively moved to determine the adaptive velocity demand profile is located at substantially the null position for the head on the disk.

7. The method of claim 4 wherein the servo system is characterized as being of the type wherein the actuator is subjected to a plurality of servo head location dependent forces that cancel at a null position for the head on the disk; and wherein the destination track to which the servo head is successively moved to determine the adaptive velocity demand profile is located at substantially the null position for the head on the disk.

8. The method of claim 4 wherein the parameters indicative of the mechanical response of the actuators to currents supplied thereto for the sample data storage devices are divided into a plurality of ranges and wherein the selected adaptive velocity profiles stored in the microcomputers include one adaptive velocity profile corresponding to a value of said parameter in each range.

9. In a servo system for a rotating disk data storage device of the type wherein a servo head adjacent one side of a rotating disk is moved radially between tracks magnetically recorded on the disk in a seek mode of operation of the servo system by an electromechanical actuator responsive to a current supplied thereto to accelerate the servo head in relation to a head velocity demand profile, a method for eliminating overshoot of a destination track arising from an inability of the servo head to follow the velocity demand profile, comprising the steps of:

measuring a parameter indicative of the mechanical response of the actuator to an electrical current supplied thereto; and thereafter effecting movement of the head in the seek mode in accordance with an adaptive velocity demand profile having terminal portions selected in relation to the value of said parameter to eliminate actuator current ringing following movement of the servo head to the destination track;

wherein the servo system is further characterized as being of the type wherein the actuator is subjected to a plurality of head location dependent forces that cancel at a null position for the head on the disk and wherein said parameter is the time required for the head to traverse a selected number of tracks about the null position in response to a selected current supplied to the actuator.

10. The method of claim 9 wherein the adaptive velocity demand profile is further characterized as having terminal portions differing from a nominal velocity demand profile selected to move a servo head following such nominal velocity demand profile to the destination track without overshoot by selected velocity increments subtracted from velocities demanded by the nominal velocity demand profile for a selected number of consecutive tracks terminating with the destination track.

11. The method of claim 10 wherein the velocity increments increase linearly to a maximum value at the destination track.

* * * * *

UNITED STATES PATENT AND TRADEMARK OFFICE
CERTIFICATE OF CORRECTION

PATENT NO. :  5,132,855
DATED      :  July 21, 1992
INVENTOR(S) : David C. Waugh and Robert D. Murphy It is certified that error appears in the above-identified patent and that said Letters Patent is hereby corrected as shown below:

Column 3, line 33, delete "profile s" and substitute therefor --profile so--; and Column 12, line 65, delete "describe" and substitute therefor --described--.

Signed and Sealed this

Twenty-first Day of December, 1993

*Attest:*

BRUCE LEHMAN

*Attesting Officer*     *Commissioner of Patents and Trademarks*